UNITED STATES PATENT OFFICE.

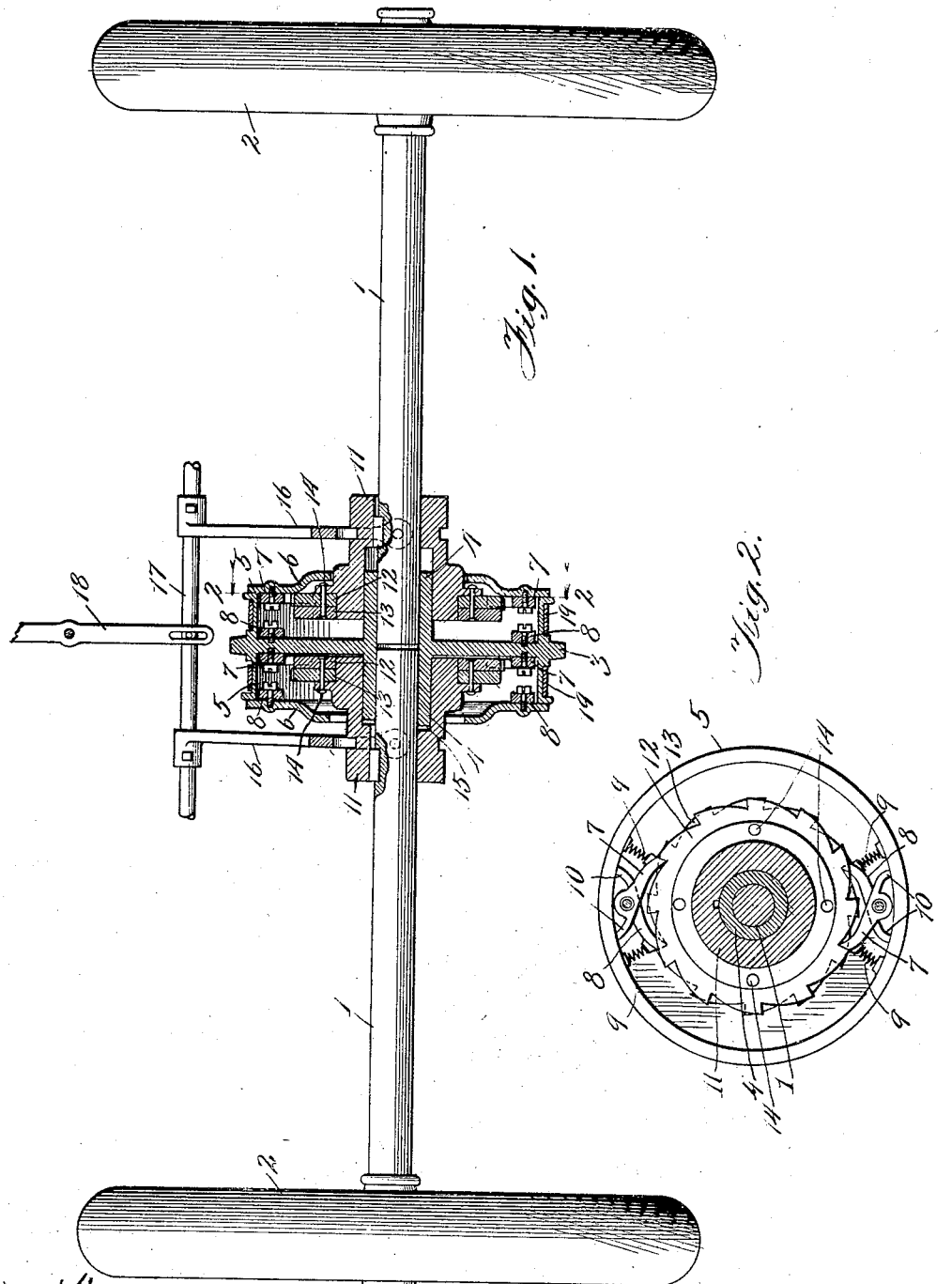

CHARLES B. HATFIELD, JR., OF OSHKOSH, WISCONSIN.

AUTOMOBILE DRIVING MECHANISM.

943,746.  Specification of Letters Patent.  Patented Dec. 21, 1909.

Application filed August 3, 1908. Serial No. 446,700.

*To all whom it may concern:*

Be it known that I, CHARLES B. HATFIELD, Jr., a citizen of the United States, residing at Oshkosh, in the county of Winnebago and State of Wisconsin, have invented certain new and useful Improvements in Automobile Driving Mechanism, of which the following is a specification.

My invention relates to the driving mechanism of self-propelled vehicles such as automobiles and the like and the object thereof is to provide a simple and efficient mechanism not only having driving functions but also differential functions so that the ordinary differential may be dispensed with. My mechanism as herein shown is therefore a combined driving mechanism and differential.

The various features of advantage and utility in my construction of driving mechanism will be apparent from the description hereinafter given.

In the drawing Figure 1 is an elevation illustrating the two driving wheels of an automobile and showing my driving mechanism in full; and Fig. 2 a section on the line 2—2 of Fig. 1.

Referring to the present embodiment of my invention as illustrated in the drawing the axle is of the divided type, the same being formed of two live portions 1 meeting at the center and there supported by the parts of the driving mechanism to be described. The outer ends of these axles carry the usual driving road wheels 2 of the automobile rigidly mounted thereon, the same being connected therewith for driving purposes in any of the well known ways.

It will be understood that the axles may be driven by any suitable prime mover such as a gasolene or steam engine and as such motive power as well as the operating connections are so well-known, the same have not been shown.

In the present instance the operating connection immediately connected with the driving mechanism for the axles or so called divided axle is a sprocket wheel 3 although so far as my invention is broadly concerned I do not limit myself to such specific driving connection inasmuch as, for instance, a bevel gear drive may be substituted. This sprocket wheel is preferably arranged midway between the driving wheels and in line with the approximate ends of the members of the divided axle and the same is moreover provided with an extended hub 4 projecting on both sides of the sprocket wheel and surrounding such approximate ends of the divided axle but arranged to move with respect thereto. The sprocket wheel near its periphery is extended to form circumferential flanges 5 5 and in addition such flanges are provided with inwardly-directed flanges 6 6. The resulting structure is a cylindrical casing or drum in or on which portions of the driving mechanism, hereinafter described, are supported. In the present instance, this casing is used as a braking drum. Within said casing and on opposite sides of the sprocket wheel are pivoted pawls 7 and 8, of which there is, in the present instance, a pair on each side, although if desired a greater or less number may be employed. The said casing is provided on its inner side opposite said pawls with similar pairs or sets of pawls 7 and 8. The pawls 7 are reversed with respect to the pawls 8 in order to coöperate with reversely pitched ratchets hereinafter described. The sprocket wheel formed as described thus acts as a pawl carrier for both sets of pawls. All of these pawls are inwardly spring-pressed by means of springs 9, and in order to limit such inward movement each pawl is provided with an extension 10 adapted to strike against the inner periphery of the casing and to thereby act as a stop.

Upon each axle is splined a ratchet carrier or support 11 each of which carries two ratchets 12 and 13 upon its periphery. These ratchets, which have reversely-pitched ratchet teeth, are in the form of rings and are arranged in parallel planes and in juxtaposition, the same being secured to each other and to the carrier in suitable manner as by means of the rivets 14. Each ratchet carrier is splined as stated at its outer hub portion but its inner portion is provided with a counter-bore 15 adapted to fit over the hubs 4 of the sprocket wheel. The purpose of splining these ratchet carriers upon the axle is to permit of their movement longitudinally of such axle for a purpose hereinafter explained. In order to thus move or shift these ratchet carriers and to shift them in unison, any suitable shifting mechanism may be employed and as an example of such mechanism I have shown two shifter arms 16 operatively connected at their outer ends to the ratchet carriers and secured at their other ends to a shifter bar 17 whose shifting is controlled by the shifting lever 18, which may be extended within convenient reach of the operator so as to be under his control.

The construction and arrangement of the parts are such that the two ratchets 12 coöperate with the pawls 7 while the two ratchets 13 coöperate with the pawls 8. When the parts are in the particular position shown in Fig. 1 the ratchets 12 and the pawls 7 are in coöperative relationship, at which time the other sets of ratchets and pawls are inactive. Assuming that when the parts are in the relative position shown in Fig. 1 the vehicle will be driven forward, the power of the prime mover transmitted to the sprocket wheel 3 will be transmitted through the pawl 7 to the ratchets 12 and ratchet carriers 11 and from thence to the divided axle and the driving road wheels. In driving straight ahead both sets of pawls will act upon their ratchets for driving purposes. When the direction of motion is to be reversed, that is when the vehicle is to be driven backwardly, the sprocket wheel 3 is driven in the opposite direction through suitable transmission mechanism (not shown) but at this time the ratchet carriers have been shifted to the left (Fig. 1) with the result that the other sets of ratchets and pawls are brought into play and the driving road wheels are thereupon operated in the opposite direction.

Inasmuch as the driving is through the medium of ratchets and pawls I am enabled to combine in my driving mechanism the functions of a differential. As is well-known, the inside wheel does the driving when the vehicle is turning a corner and will run slower than the outer wheel whose faster motion is provided for my permitting the pawls to run loosely over the ratchet wheels. Consequently the same mechanism which does the driving in my construction and arrangement also serves as a differential, performing all the functions of the ordinary differential but with an absence of the complication and large number of parts of such differential.

The casing formed in connection with the sprocket wheel may be utilized to advantage, as hereinbefore stated as a part of the braking mechanism and to this end the flanges 5 form brake drums adapted to coöperate with the usual brake bands 19 of a contracting form of band brake.

While I prefer to employ ratchets and pawls as my self-acting driving connections, yet equivalents thereof may be employed.

I claim:

1. In a driving mechanism for a self-propelled vehicle, the combination, with the driving road wheels of such a vehicle, of a divided live axle connected to such wheels, ratchet carriers arranged at the proximate ends of the members of such axle and mounted to rotate with but move longitudinally thereof, a pawl support adapted to be driven by a prime mover, sets of pawls thereon, ratchets mounted on said carriers and having reversed ratchet teeth, said ratchets being adapted to coöperate with said pawls, and means for disconnecting one set of ratchets and pawls and connecting another set thereof; substantially as described.

2. In a driving mechanism for a self-propelled vehicle, the combination with the driving road wheels of such a vehicle, of a divided live axle connected to such wheels, ratchet carriers mounted to rotate with said axle, a pawl support adapted to be driven by a prime mover thereon, rotatable ratchets having reversed ratchet teeth, said ratchets being mounted on said carriers and adapted to coöperate with said pawls, and means for disconnecting one set of ratchets and pawls and connecting another set thereof, substantially as described.

3. In a driving mechanism for a self-propelled vehicle, the combination, with the driving road wheels of such a vehicle, of a divided live axle connected to rotate with such wheels, ratchet carriers arranged at the proximate ends of the members of such axle and mounted to rotate with but move longitudinally thereof, a pawl support comprising a wheel driven by a prime mover and provided with flanges forming a casing, sets of oppositely acting pawls, mounted on said pawl support, ratchets mounted on said carriers and having reversely pitched teeth, said ratchets being adapted to coöperate with said pawls, and means for disconnecting one set of ratchets and pawls and connecting another set thereof; substantially as described.

4. In a driving mechanism for a self-propelled vehicle, the combination, with the driving road wheels of such a vehicle, of a divided live axle connected to rotate with such wheels, ratchet carriers arranged at the proximate ends of the members of such axle and adapted to be operatively connected therewith, a pawl support driven by a prime mover and having a hub surrounding the proximate ends of the members of the axle, sets of oppositely acting pawls on such support, ratchets secured to said carriers and adapted to coöperate with the pawls, and means for disconnecting one set of ratchets and pawls and connecting another set thereof; substantially as described.

5. In a driving mechanism for a self-propelled vehicle, the combination, with the driving road wheels of such a vehicle, of a divided live axle connected to such wheels, ratchet carriers arranged at the proximate ends of the members of such axle and adapted to be operatively connected therewith, a pawl support driven by a prime mover and having a hub surounding the proximate ends of the members of the axle, said ratchet carriers being counterbored at their inner ends to fit over said hub, sets of oppositely acting pawls on such support, ratchets secured to said carriers and adapted to coöperate with the pawls, and means for disconnecting one set of ratchets and pawls and connecting another set thereof; substantially as described.

CHARLES B. HATFIELD, Jr.

Witnesses:
R. A. HOLLISTER,
H. I. WEED.